US012799044B2

(12) United States Patent
Liu et al.

(10) Patent No.: US 12,799,044 B2
(45) Date of Patent: Nov. 17, 2026

(54) BIODEGRADABLE UREA-FORMALDEHYDE-BASED SAND-FIXING POLYMER MATERIAL WITH SLOW NUTRIENT RELEASE AND WATER ABSORPTION AND RETENTION

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Yingfang Tong, Taiyuan (CN); Guizhe Zhao, Taiyuan (CN); Yang Xiang, Taiyuan (CN)

(73) Assignees: NORTH UNIVERSITY OF CHINA, Taiyuan City (CN); SHANXI ZHONGBEI NEW MATERIAL TECHNOLOGY CO., LTD., Taiyuan City (CN)

( * ) Notice: Subject to any disclaimer, the term of this patent is extended or adjusted under 35 U.S.C. 154(b) by 826 days.

(21) Appl. No.: 18/067,310

(22) Filed: Dec. 16, 2022

(65) Prior Publication Data

US 2023/0123541 A1 Apr. 20, 2023

(30) Foreign Application Priority Data

Dec. 31, 2021 (CN) ......................... 202111670583.5

(51) Int. Cl.
*C05G 5/30* (2020.01)
*C05B 7/00* (2006.01)
(Continued)

(52) U.S. Cl.
CPC .................. *C05C 9/02* (2013.01); *C05B 7/00* (2013.01); *C05G 1/00* (2013.01); *C05G 3/40* (2020.02); *C05G 3/80* (2020.02); *C05G 5/37* (2020.02); *C09K 17/16* (2013.01); *C09K 17/28* (2013.01); *D06M 15/564* (2013.01); *D06M 2101/32* (2013.01); *D06M 2200/00* (2013.01)

(58) Field of Classification Search
CPC ........... E02D 3/005; C05C 9/02; C09K 17/20; C09K 17/70; C05G 3/80; C05G 5/40; C05G 3/90; C05G 3/40; C05G 3/30
USPC ........................................................ 427/398.5
See application file for complete search history.

(56) References Cited

U.S. PATENT DOCUMENTS

2019/0031574 A1* 1/2019 Liu ........................ C09K 17/22

FOREIGN PATENT DOCUMENTS

CN 109628097 A 4/2019
CN 110330980 B 7/2021
(Continued)

*Primary Examiner* — Tabassom Tadayyon Eslami

(57) ABSTRACT

A biodegradable urea-formaldehyde-based sand-fixing polymer material with slow nutrient release and water absorption and retention, including a biodegradable urea-formaldehyde-based polymer composite with slow nutrient release and water absorption and retention, and a biodegradable polymer fabric. The biodegradable urea-formaldehyde-based polymer composite is coated on a surface of the biodegradable polymer fabric, and is embedded in meshes of the biodegradable polymer fabric. There is intermolecular hydrogen-bond interaction between the biodegradable urea-formaldehyde-based polymer composite and the biodegradable polymer fabric.

6 Claims, 5 Drawing Sheets

(51) Int. Cl.

| | |
|---|---|
| ***C05C 9/02*** | (2006.01) |
| ***C05G 1/00*** | (2006.01) |
| ***C05G 3/40*** | (2020.01) |
| ***C05G 3/80*** | (2020.01) |
| ***C09K 17/16*** | (2006.01) |
| ***C09K 17/28*** | (2006.01) |
| ***D06M 15/564*** | (2006.01) |
| *D06M 101/32* | (2006.01) |

(56) References Cited

FOREIGN PATENT DOCUMENTS

| | | | | |
|---|---|---|---|---|
| CN | 114195590 | A | | 3/2022 |
| NO | 148269 | | * | 5/1983 |

* cited by examiner

BIODEGRADABLE UREA-FORMALDEHYDE-BASED SAND-FIXING POLYMER MATERIAL WITH SLOW NUTRIENT RELEASE AND WATER ABSORPTION AND RETENTION

CROSS-REFERENCE TO RELATED APPLICATIONS

This application claims the benefit of priority from Chinese Patent Application No. 202111670583.5, filed on Dec. 31, 2021. The content of the aforementioned application, including any intervening amendments thereto, is incorporated herein by reference in its entirety.

TECHNICAL FIELD

This application relates to biodegradable polymer materials, and more particularly to a biodegradable urea-formaldehyde-based sand-fixing polymer material with slow nutrient release and water absorption and retention.

BACKGROUND

Desertification has become the greatest threat to mankind in the 21st century, and at present, hundreds of countries and regions (accounting for about ¼ of the world's land area) are suffering desertification. Desertification not only causes huge economic losses, but also leads to a drastic decrease in land productivity and a serious deterioration of the ecological environment, thereby threatening the survival and development of human beings. China is currently suffering large-area and wide-distribution desertification, thus considerable attention has been paid to the desertification control. Recently, extensive researches have been conducted on the prevention and control of desertification and development of sand-fixing materials.

The existing sand fixation strategies mainly include mechanical sand fixation, chemical sand fixation and biological sand fixation. Each sand fixation technology has its advantages and disadvantages. The mechanical sand fixation has a desirable wind-proofing effect, but the non-degradable materials will pollute the desert. The chemical sand fixation is conductive to water and fertility retention, but is limited by the spraying of sand-fixing agents. The biological sand fixation is beneficial to the long-term control of desert, but it is difficult for plants to survive in the desert. Therefore, it is required to reasonably integrate these methods to enhance the effectiveness of the desertification control.

Polymer materials, due to their advantages of convenience, rapid effectiveness and low cost, have been widely used in desertification prevention and control and highway slope protection. Unfortunately, these petrochemical derivatives are also accompanied by secondary pollution to the environment. Therefore, the development and application of biodegradable sand-fixing materials have attracted extensive attention. The sand-protecting barrier made of biodegradable polymer materials has simple operation, easy transportation, good durability and durable protective effect, and will not cause secondary pollution. Accordingly, biodegradable polymer materials have been applied as a novel sand-protecting barrier material for windbreak and sand fixation.

The deserted soils are infertile, porous, and poor in water and fertility retention, and thus not suitable for plant growth. In view of this, super absorbent polymers (SAP) with good water absorption and retention as well as superior adhesion properties have been widely used in the preparation of sand-fixing agents, which can also provide water for plant growth in addition to consolidating sand.

SUMMARY

In order to overcome the defects in the prior art, this disclosure provides a biodegradable urea-formaldehyde-based sand-fixing polymer material with slow nutrient release and water absorption and retention, which can not only exhibit wind-proofing and sand-fixation effects, but also provide desired water and fertilizer conditions for the plants in desert.

The technical solutions of this application are described as follows.

In a first aspect, this application provides a biodegradable urea-formaldehyde-based sand-fixing polymer material with slow nutrient release and water absorption and retention, comprising:

a biodegradable urea-formaldehyde-based polymer composite with slow nutrient release and water absorption and retention; and a biodegradable polymer fabric;

wherein the biodegradable urea-formaldehyde-based polymer composite is coated on a surface of the biodegradable polymer fabric, and is embedded in meshes of the biodegradable polymer fabric; and there is intermolecular hydrogen-bond interaction between the biodegradable urea-formaldehyde-based polymer composite and the biodegradable polymer fabric.

In some embodiments, an interfacial bonding strength between the biodegradable urea-formaldehyde-based polymer composite and the biodegradable polymer fabric is greater than a breaking strength of the biodegradable polymer fabric.

In a second aspect, this application provides a method for preparing the above-mentioned biodegradable urea-formaldehyde-based sand-fixing polymer material, consisting of:

coating the biodegradable urea-formaldehyde-based polymer composite on the surface of the biodegradable polymer fabric, followed by thermal curing of the biodegradable urea-formaldehyde-based polymer composite on the surface of the biodegradable polymer fabric, rolling and drying to obtain the biodegradable urea-formaldehyde-based sand-fixing polymer material.

In some embodiments, a coating mass of the biodegradable urea-formaldehyde-based polymer composite on the biodegradable polymer fabric is 0.1-0.5 g/cm$^2$.

In some embodiments, a pressure of the rolling is greater than 0 MPa and equal to or less than 1 MPa.

In some embodiments, a speed of the rolling is 10-50 rpm.

In some embodiments, the thermal curing is performed at 45-65° C. for 0.5-4 h.

In some embodiments, a temperature of the drying is 45-65° C.

In some embodiments, the biodegradable urea-formaldehyde-based polymer composite is prepared through steps of:

adding formaldehyde and urea into a reaction vessel, followed by adjustment to pH 8 and reaction at a first preset temperature for a first preset time; and adding an inorganic fertilizer containing phosphorus and potassium, and a super absorbent polymer (SAP) or a monomer of the SAP into the reaction vessel, followed by reaction at a second preset temperature for a second preset time to obtain the biodegradable urea-formaldehyde-based polymer composite in a viscous state.

In some embodiments, the first preset temperature is 30-60° C.; and the first preset time is 0.5-4 h.

In some embodiments, the second preset temperature is 40-80° C.; and the second preset time is 0.5-4 h.

In a third aspect, this application provides a water-retention, wind-proofing, and sand-fixation method for a region in need thereof, comprising:

applying the biodegradable urea-formaldehyde-based sand-fixing polymer material of claim 1 to the region.

Compared to the prior art, the application has the following beneficial effects.

(1) The biodegradable urea-formaldehyde-based sand-fixing polymer material with a hydrogen-bond interaction between its phases provided herein has an easy and simplified preparation process, merely consisting of heat curing of a biodegradable urea-formaldehyde-based polymer composite with slow nutrient release and water absorption and retention on a surface of a biodegradable polymer fabric and a subsequent rolling step, and is easy to realize industrial production.

(2) Regarding the biodegradable urea-formaldehyde-based sand-fixing polymer material provided herein, the biodegradable urea-formaldehyde-based polymer composite will be embedded into the meshes of the biodegradable polymer fabric after coated, and there is intermolecular hydrogen-bond interaction therebetween, allowing for large bonding strength.

(3) The biodegradable urea-formaldehyde-based sand-fixing polymer material provided herein has water absorption and retention functions, which can store water when it rains, relieving soil erosion.

(4) The biodegradable urea-formaldehyde-based sand-fixing polymer material provided herein will be gradually hydrolyzed and degraded into small-molecule nutrients under the action of water and microorganisms, which will be absorbed by plants to promote the plant growth. Those degradation products are harmless and environmentally friendly.

(5) The biodegradable urea-formaldehyde-based sand-fixing polymer material provided herein has excellent mechanical property, and exhibits great wind-proofing, sand-fixation, and water adsorption and retention performances. Moreover, it also contains nutrients needed for plant growth and development, such as nitrogen, phosphorus and potassium, and thus can provide desired water and fertilizer conditions for plants in desert.

BRIEF DESCRIPTION OF THE DRAWINGS

The accompanying drawings needed in the description of the embodiments of the disclosure will be briefly described below to explain the technical solutions of the present disclosure more clearly. Obviously, presented in the accompanying drawings are merely some embodiments of the present disclosure, and other drawings can be obtained by those skilled in the art based on the drawings provided herein without paying creative effort.

DETAILED DESCRIPTION OF EMBODIMENTS

Figure 1:
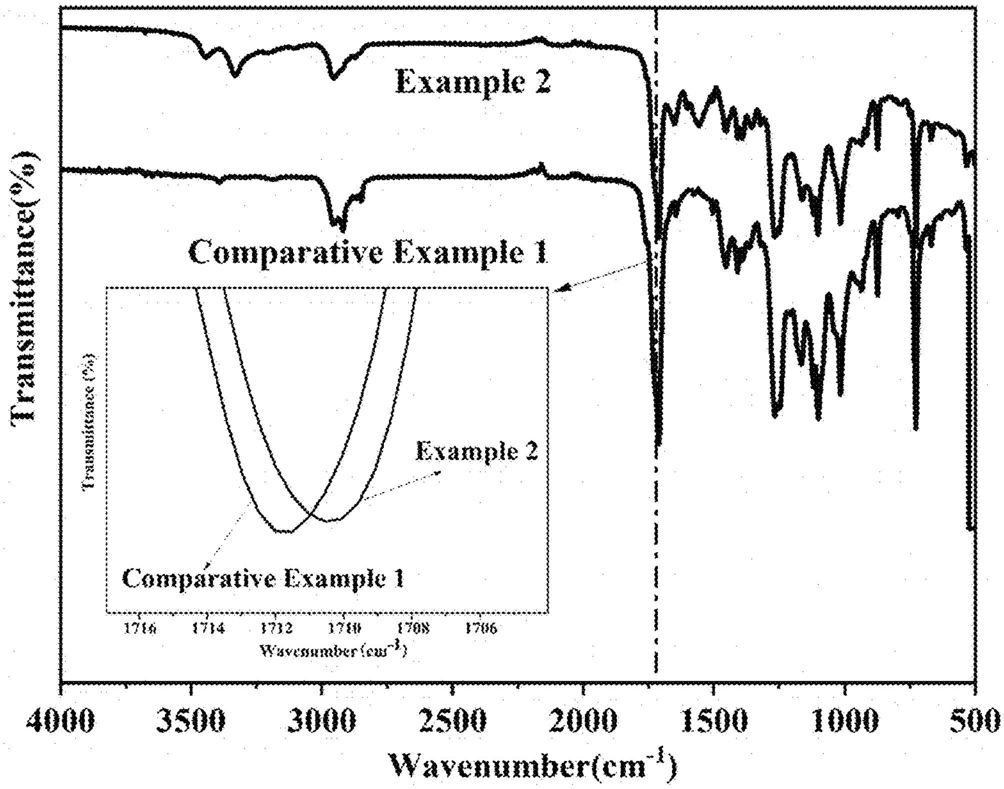
FIG. 1 shows the infrared (IR) spectra of the biodegradable urea-formaldehyde-based sand-fixing polymer materials prepared in Example 2 and the polylactic acid (PLA) fabric obtained by stripping corn straw (CS)-modified polyacrylic acid ($PAA_{CS}$)/mono-potassium dihydrogen phosphate ($KH_2PO_4$)/urea formaldehyde (UF)-1 from the surface of the PLA fabric of composite prepared in Comparative Example 1.

The present disclosure will be described in detail below with reference to the embodiments and accompanying drawings. Obviously, described below are merely some embodiments of this disclosure, and are not intended to limit the disclosure. Other embodiments obtained by those skilled in the art based on the embodiments provided herein without paying any creative effort should fall within the scope of the present disclosure.

Measurement methods in this application are described below.

(1) Infrared (IR) Spectroscopy

The surface of the biodegradable polymer fabric after the urea-formaldehyde-based composite stripped from the surface of the biodegradable urea-formaldehyde-based sand-fixing polymer material was analyzed by IR spectroscopy.

(2) Tensile Strength

The biodegradable urea-formaldehyde-based sand-fixing polymer material was cut into obtaining strips with 30×100 $mm^2$, which were tested for the tensile strength by using a high-low temperature universal tensile testing machine, where a clamp distance was 50 mm; a calibration distance was 25 mm; a speed was 30 mm/min; and 5 replicates were set for each test.

(3) Water Absorption Capacity

The biodegradable urea-formaldehyde-based sand-fixing polymer material sample was weighed at room temperature, placed in a 300-mesh nylon bag with known weight, and then put into a beaker with 300 mL of distilled water. The sample was taken out every other 10 min, wiped with skimmed cotton and then weighed. The measurement was continuously performed for 120 min. The water absorption rate $Q_{eq}$ (g/g) was calculated as formula (1):

$$Q_{eq} = \frac{M - M_0}{M_0} \times 100; \quad (1)$$

where M is the weight of the sample after water absorption and $M_0$ is the weight of the sample before water absorption.

(4) N and P Release

The sample was put into a 300-mesh nylon bag, and buried in 500 g of sand at a depth of 3 cm. The humidity of the sand was kept at 20% during the whole test process. The sample was destructively sampled, weighed, and subjected to N and P content tests, respectively, on days 5, 10, 15, 20, 25 and 30.

(5) Anti-Wind Erosion Capacity 500 g of sand were piled into a sandpile with a diameter of 10 cm and a height of 5 cm on a plastic plate. A bag (length: 10 cm; and width: 5 cm) made of the biodegradable urea-formaldehyde-based sand-fixing polymer material was filled with 40 g of sand and laid at a windward side of the sandpile. Wind with a speed of 15 m/s (corresponding to near gale) was adopted, and the sand was weighed at different moments.

(6) Water-Holding Capacity

The biodegradable urea-formaldehyde-based sand-fixing polymer material was woven into a bag with a length of 10 cm and a width of 5 cm. 40 g of sand were put into the bag to form a sandbag. The sandbag was placed in a polyvinyl chloride (PVC) tube with a diameter of 4.5 cm (a bottom of the PVC tube was sealed with a 300-mesh nylon bag) and weighed (denoted as $M_1$). Then the PVC tube was fixed on an iron support, and fed with tap water from its top until tap water seeped out from the bottom of the sandbag. The PVC tube was allowed to stand for a period till there was no tap water seeped from the sandbag, and then the sandbag was taken out from the PVC tube and weighed (denoted as $M_2$). The water-holding rate (WH %) was calculated as formula (2):

$$WH\ \% = \frac{(M_2 - M_1) \times 100}{40}. \quad (2)$$

(7) Water Retention Capacity

The biodegradable urea-formaldehyde-based sand-fixing polymer material was woven into a bag with a length of 10 cm and a width of 5 cm. 40 g of sand were put into the bag to form a sandbag. The sandbag was placed into a 500 mL plastic bottle and weighed (denoted as $M_0$). The sand was gradually wetted with tap water till saturated, where the amount of tap water was determined according to the water-holding rate of the sand. The plastic bottle containing the sandbag was weighed again (denoted as $M_1$). The plastic bottle was weighed at the same time every day until its weight was constant. A water retention rate (WR %) was calculated through formula (3):

$$WR\ \% = \frac{(M_i - M_0) \times 100}{M_1 - M_0}. \quad (3)$$

Technical solutions of the present disclosure and the prior art will be described below in detail.

Provided herein was a biodegradable urea-formaldehyde-based sand-fixing polymer material with slow nutrient release and water absorption and retention, including a biodegradable urea-formaldehyde-based polymer composite with slow nutrient release and water absorption and retention and a biodegradable polymer fabric; where the biodegradable urea-formaldehyde-based polymer composite with slow nutrient release and water absorption and retention included a urea-formaldehyde polymer, a SAP, an inorganic fertilizer; where the SAP is $PAA_{CS}$; the inorganic fertilizer is $KH_2PO_4$; and the biodegradable polymer fabric is PLA fabric.

The biodegradable urea-formaldehyde-based sand-fixing polymer materials of Examples 1-3 were prepared according to the following steps.

(S1) Formaldehyde and urea were added into an airtight reaction vessel to obtain a mixed solution, where a molar ratio of formaldehyde to urea was 1:2. The mixed solution was adjusted to pH 8 and reacted at 40° C. for 2 h to obtain a methylol urea (MU) solution.

(S2) An acrylic acid (AA) solution was adjusted to neutralization of 80% by using potassium hydroxide (KOH). The AA solution, pre-treated CS, $KH_2PO_4$ and ammonium persulfate were successively added into the MU solution, in which a weight ratio of AA to CS to ammonium persulfate was 100:10:0.3; and a weight ratio of $KH_2PO_4$ to the MU in the MU solution was 1:20. The mixed solution was reacted at 60° C. for 2 h under a nitrogen atmosphere to obtain a viscous composite $PAA_{CS}/KH_2PO_4$/UF-n, where n was a weight ratio of AA to MU.

(S3) The composite $PAA_{CS}/KH_2PO_4$/UF-n was coated on a surface of the PLA fabric at 0.2 g/cm$^2$, cured at 55° C. for 2 h, and rolled at 0.6 MPa and 40 rpm by using a padder.

(S4) The PLA fabric coated with the composite $PAA_{CS}/KH_2PO_4$/UF-n obtained in step (S3) was dried at 55° C. to a constant weight, so as to obtain the biodegradable urea-formaldehyde-based sand-fixing polymer material.

The weight ratio of AA to MU in Example 1 was 1.5:1.0; the weight ratio of AA to MU in Example 2 was 1.0:1.0; the weight ratio of AA to MU in Example 3 was 0.5:1.0

Regarding Example 1, the biodegradable urea-formaldehyde-based sand-fixing polymer material, which was prepared by the PLA fabric coated with the urea-formaldehyde-based composite $PAA_{CS}/KH_2PO_4$/UF-1.5, had a tensile strength of 2.42 MPa and a water absorption rate of 21.67 g/g, and contained 6.55 wt. % of element N, 0.61 wt. % of element P (in $P_2O_5$) and 24.97 wt. % of element K (in $K_2O$).

Regarding Example 2, the biodegradable urea-formaldehyde-based sand-fixing polymer material, which was prepared by the PLA fabric coated with the urea-formaldehyde-based composite $PAA_{CS}/KH_2PO_4$/UF-1, had a tensile strength of 2.66 MPa and a water absorption rate of 41.59 g/g, and contained 11.03 wt. % of element N, 1.03 wt. % of element P (in $P_2O_5$) and 21.37 wt. % of element K (in $K_2O$).

Regarding Example 3, the biodegradable urea-formaldehyde-based sand-fixing polymer material, which was prepared by the PLA fabric coated with the urea-formaldehyde-based composite $PAA_{CS}/KH_2PO_4$/UF-0.5, had a tensile strength of 0.7 MPa and a water absorption rate of 10.06 g/g, and contained 16.76 wt. % of element N, 1.57 wt. % of element P (in $P_2O_5$) and 16.77 wt. % of element K (in $K_2O$).

Comparative Example 1

Provided herein was a composite PLA+($PAA_{CS}$/$KH_2PO_4$/UF-1), which was prepared through the following steps.

(S1) Formaldehyde and urea were added into an airtight reaction vessel to obtain a mixed solution, where a molar ratio of formaldehyde to urea was 1:2. The mixed solution was adjusted to pH=8 and reacted at 40° C. for 2 h to obtain a methylol urea (MU) solution. This step was identical to step (S1) in Examples 1-3.

(S2) An acrylic acid (AA) solution was adjusted to neutralization of 80% by using KOH. The AA solution, pre-treated CS, $KH_2PO_4$ and ammonium persulfate were successively added into the MU solution, in which a weight ratio of the MU in the MU solution to AA to CS to ammonium persulfate to $KH_2PO_4$ was 100:100:10:0.3:5. The mixed solution was reacted at 60° C. for 2 h under a nitrogen atmosphere to obtain the viscous composite $PAA_{CS}$/$KH_2PO_4$/UF-1. This step was identical to step (S2) in Example 2.

(S3) The composite $PAA_{CS}$/$KH_2PO_4$/UF-1 was coated on a surface of a poly tetrafluoroethylene (PTFE) plate at 0.2 g/cm$^2$, and cured at 55° C. for 2 h. The composite $PAA_{CS}$/$KH_2PO_4$/UF-1 was removed from the PTFE plate.

(S4) The composite $PAA_{CS}$/$KH_2PO_4$/UF-1 obtained in step (S3) was superimposed with the PLA fabric, and rolled at 0.6 MPa and 40 rpm by using a padder. The rolled composite was dried at 55° C. to a constant weight, so as to obtain the composite PLA+($PAA_{CS}$/$KH_2PO_4$/UF-1).

In conclusion, the other steps of the preparation process in Comparative Example 1 were the same as those in Example 2 except that the composite $PAA_{CS}$/$KH_2PO_4$/UF-1 was thermal cured first and then placed on the surface of the PLA fabric for rolling, that is, the composite $PAA_{CS}$/$KH_2PO_4$/UF-1 is not solidified on the surface of the PLA fabric, so that there is no hydrogen-bond interaction between the composite $PAA_{CS}$/$KH_2PO_4$/UF-1 and the PLA fabric in the composite PLA+($PAA_{CS}$/$KH_2PO_4$/UF-1). In Example 2, the composite $PAA_{CS}$/$KH_2PO_4$/UF-1 was thermal cured on the surface of PLA fabric and then rolled, so that there is hydrogen-bond interaction between the composite $PAA_{CS}$/$KH_2PO_4$/UF-1 and the PLA fabric in the composite PLA/$PAA_{CS}$/$KH_2PO_4$/UF-1. The composite PLA+($PAA_{CS}$/$KH_2PO_4$/UF-1) had a tensile strength of 1.73 MPa and a water absorption rate of 38.62 g/g, and contained 11.03 wt. % of element N, 1.03 wt. % of element P (in $P_2O_5$) and 21.37 wt. % of element K (in $K_2O$).

Comparative Example 2

Provided herein was a composite PLA/$PAA_{CS}$+$KH_2PO_4$/UF-1, which was prepared through the following steps.

(S1) Formaldehyde and urea were added into an airtight first reaction vessel to obtain a mixed solution, where a molar ratio of formaldehyde to urea was 1:2. The mixed solution was adjusted to pH 8 and reacted at 40° C. for 2 h to obtain a MU solution. $KH_2PO_4$ was added into the MU solution, where a weight ratio of $KH_2PO_4$ to the MU solution was 1:20. The mixed solution was heated to 60° C. and reacted to obtain a white solid. The white solid was kneaded and extruded, dried at 80° C. and ground to 300 mesh to obtain $KH_2PO_4$/UF powder.

(S2) AA was added into an airtight second reaction vessel, adjusted with KOH to neutralization of 80%, and added with pre-treated CS and an ammonium persulfate solution, where a weight ratio of AA to CS to ammonium persulfate was 100:10:0.3. The mixed solution was heated to 55° C. and reacted for 2 h to obtain viscous $PAA_{CS}$.

(S3) The viscous $PAA_{CS}$ obtained in step (S2) was mixed with the $KH_2PO_4$/UF powder, where a weight ratio of AA to the MU solution was 1:1. The mixture was mechanically stirred to be uniform to obtain a composite ($PAA_{CS}$+$KH_2PO_4$/UF-1).

(S4) The composite ($PAA_{CS}$+$KH_2PO_4$/UF-1) obtained in step (S3) was coated on a surface of the PLA fabric at 0.2 g/cm$^2$, cured at 55° C. for 2 h, rolled at 0.6 MPa and 40 rpm by using a padder and dried at 55° C. to a constant weight, so as to obtain the composite PLA/$PAA_{CS}$+$KH_2PO_4$/UF-1.

The composite PLA/$PAA_{CS}$+$KH_2PO_4$/UF-1 had a tensile strength of 1.95 MPa and a water absorption rate of 18.6 g/g, and contained 11.03 wt. % of element N, 1.03 wt. % of element P (in $P_2O_5$) and 21.37 wt. % of element K (in $K_2O$).

As shown in FIG. 1, compared to Comparative Example 1, a stretching vibration peak of carbonyl group (—C═O) in the molecular chain of PLA fabric of Example 2 showed an obvious red shift, indicating that there is intermolecular hydrogen-bond interaction between the $PAA_{CS}$/$KH_2PO_4$/UF-1 and the PLA fabric, which enhanced the interfacial bonding strength therebetween.

Figure 2:
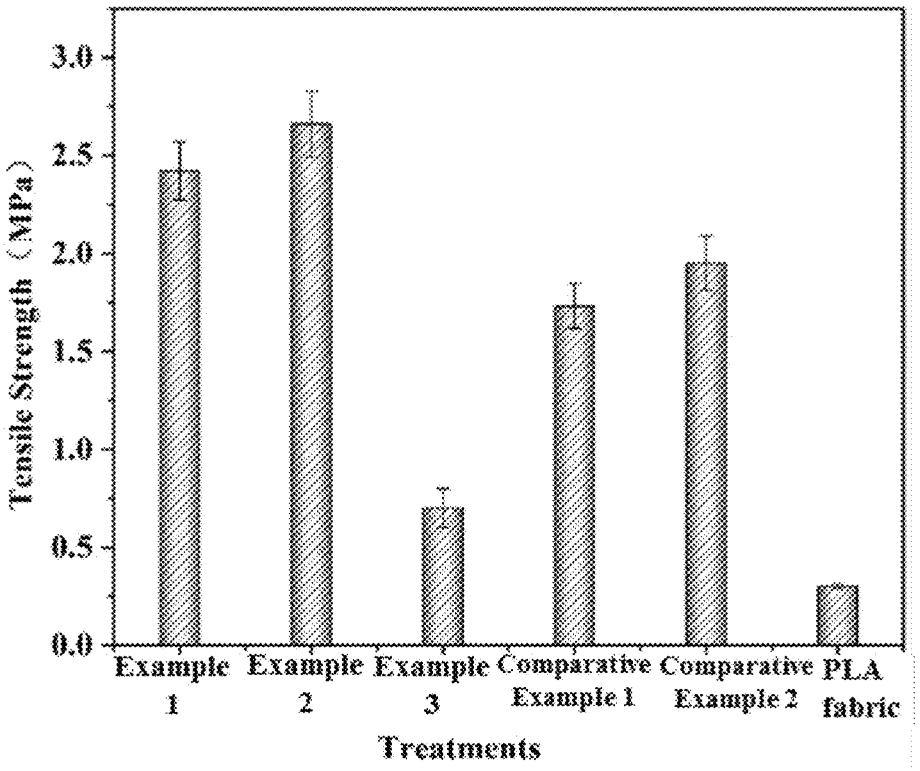
FIG. 2 shows the tensile strength of the biodegradable urea-formaldehyde-based sand-fixing polymer materials prepared in Examples 1-3 and composites prepared in Comparative Examples 1-2.

As shown in FIG. 2, the biodegradable urea-formaldehyde-based sand-fixing polymer materials prepared in Example 2 had the greatest tensile strength (2.66 MPa) due to an appropriate acrylic acid (AA)/methylol urea (MU) ratio, followed by the biodegradable urea-formaldehyde-based sand-fixing polymer materials prepared in Example 1 (2.42 MPa); and the biodegradable urea-formaldehyde-based sand-fixing polymer materials prepared in Example 3 had the lowest tensile strength (0.7 MPa). All of these results revealed that the AA/MU ratio could significantly affect the mechanical properties of the biodegradable urea-formaldehyde-based sand-fixing polymer material. Compared to the composites prepared in Comparative Examples 1-2, the biodegradable urea-formaldehyde-based sand-fixing polymer materials prepared in Examples 1 and 2 had a significantly-enhanced tensile strength, which was attributed to the great bonding strength between the biodegradable urea-formaldehyde-based polymer composite and the biodegradable polymer fabric. The bonding strength therebetween was larger than the breaking strength of the biodegradable polymer fabric (0.3 MPa).

Figure 3:
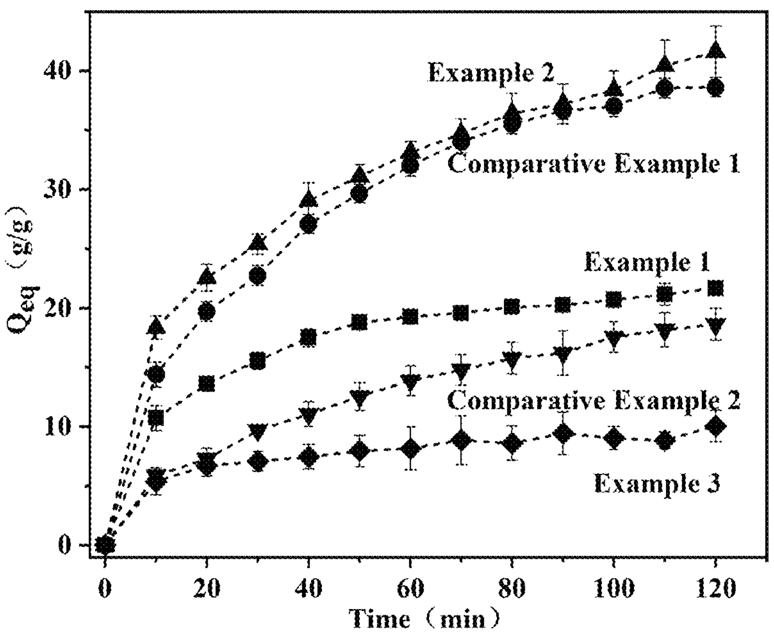
FIG. 3 shows the water absorption curves of the biodegradable urea-formaldehyde-based sand-fixing polymer materials prepared in Examples 1-3 and composites prepared in Comparative Examples 1-2.

As shown in FIG. 3, the biodegradable urea-formaldehyde-based sand-fixing polymer materials prepared in Example 2 was predominant in the water absorption capacity (41.59 g/g), which was attributed to an appropriate ratio between components, indicating the ratio of components had a significant effect on the water absorption capacity of the biodegradable urea-formaldehyde-based sand-fixing polymer material. It was observed that the water absorption capacity of the biodegradable urea-formaldehyde-based sand-fixing polymer materials prepared in Example 2 was slightly higher than that of the composite prepared in Comparative Example 1, which was attributed to the enhanced interfacial bonding strength brought by the intermolecular hydrogen-bond interaction between the biodegradable urea-formaldehyde-based polymer composite and the biodegradable polymer fabric. Therefore, Example 2 can keep structurally complete when swelling.

Figure 4A:
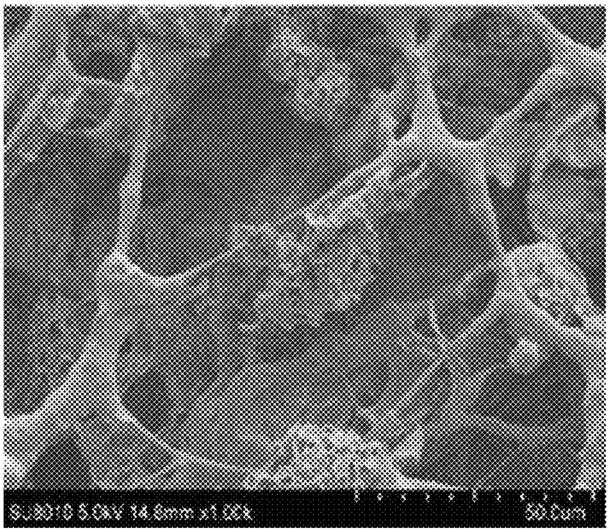
FIG. 4A is a scanning electron microscopy (SEM) image of the biodegradable urea-formaldehyde-based sand-fixing polymer material prepared in Example 1 after water adsorption.
Figure 4B:
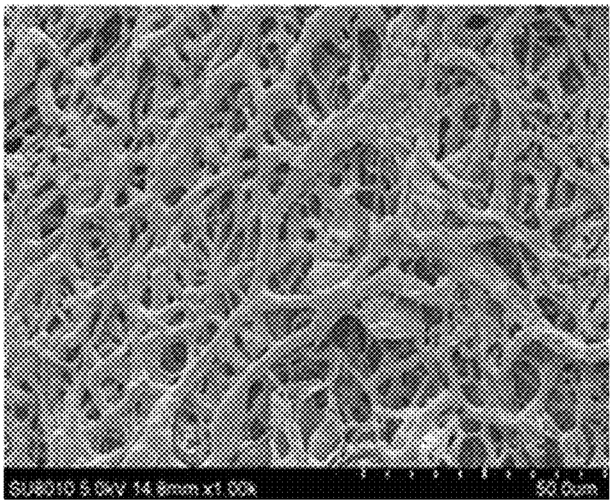
FIG. 4B is a SEM image of the biodegradable urea-formaldehyde-based sand-fixing polymer material prepared in Example 2 after water adsorption.
Figure 4C:
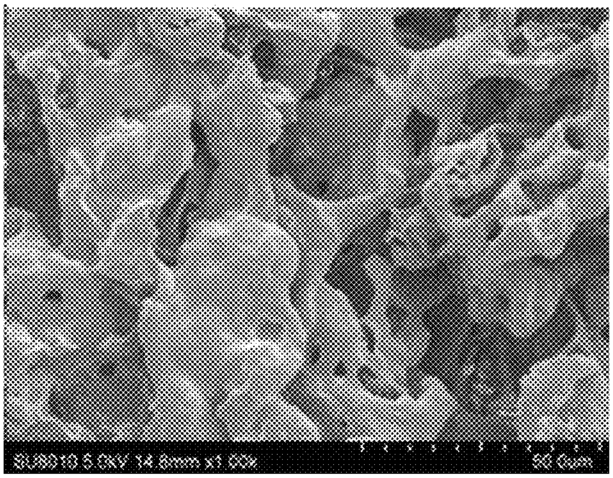
FIG. 4C is a SEM image of the biodegradable urea-formaldehyde-based sand-fixing polymer material prepared in Example 3 after water adsorption.

As shown in FIG. 4, the biodegradable urea-formaldehyde-based sand-fixing polymer materials prepared in Examples 1-3 all had a porous structure and rough surface, which facilitated the water absorption. The biodegradable urea-formaldehyde-based sand-fixing polymer material prepared in Example 2 had more uniform and stronger pores, allowing for the best water absorption capacity.

Figure 5:
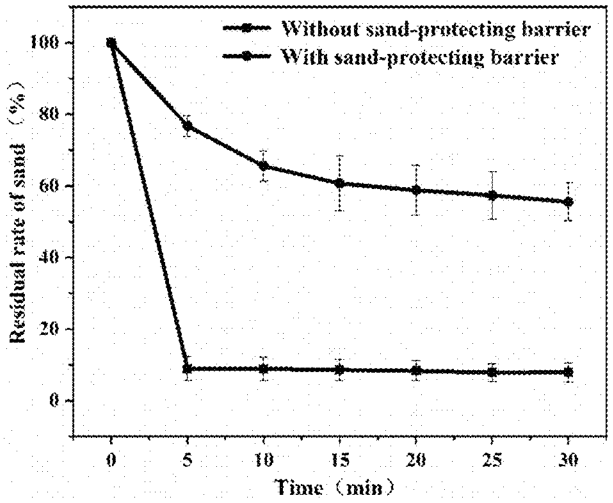
FIG. 5 shows the wind erosion curves in the presence and absence of a cylindrical sand-protecting barrier formed by the biodegradable urea-formaldehyde-based sand-fixing polymer material prepared by Example 2.

FIG. 5 showed the wind erosion curves in the presence and absence of a cylindrical sand-protecting barrier. The cylindrical sand-protecting barrier was a cylindrical sand-protecting barrier fabricated by the biodegradable urea-formaldehyde-based sand-fixing polymer material prepared in Example 2, in which sand were filled. It was observed that the cylindrical sand-protecting barrier can obviously relieve the wind erosion loss, and the sand retention rate after wind erosion was increased from 7% (no sand-protecting barrier) to 55%. In conclusion, the sand-protecting barrier fabricated by the biodegradable urea-formaldehyde-based sand-fixing polymer material provided herein contributed to a higher sand retention rate.

Figure 6A:
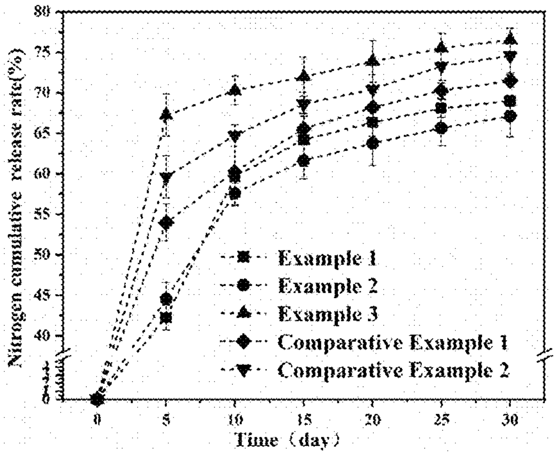
FIG. 6A shows the nitrogen (N) release curves of the sand-fixing polymer materials prepared in Examples 1-3 and the composites prepared in Comparative Examples 1-2.
Figure 6B:
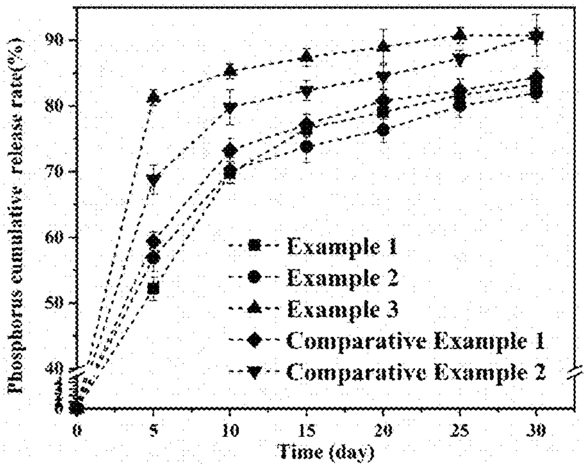
FIG. 6B shows the phosphine (P) release curves of the sand-fixing polymer materials prepared in Examples 1-3 and the composites prepared in Comparative Examples 1-2.

As shown in FIG. 6, the biodegradable urea-formaldehyde-based sand-fixing polymer materials prepared in Examples 1-3 and the composites prepared in Comparative Examples 1-2 all exhibited excellent slow release of N and P, in which Example 2 was the best. Regarding the biodegradable urea-formaldehyde-based sand-fixing polymer material of Example 2, after being placed in sand for 30 days, 67.12% of N and 81.98% of P were released. The sand-fixing polymer material of Example 2 was superior to the composite of Comparative Example 1 in the nutrient slow-release property because there was intermolecular hydrogen-bond interaction between the biodegradable urea-formaldehyde-based polymer composite and the biodegradable polymer fabric. The intermolecular hydrogen-bond interaction greatly enhanced the interfacial bonding strength between the biodegradable urea-formaldehyde-based polymer composite and the biodegradable polymer fabric, contributing to a better nutrient slow-release property.

Figure 7:
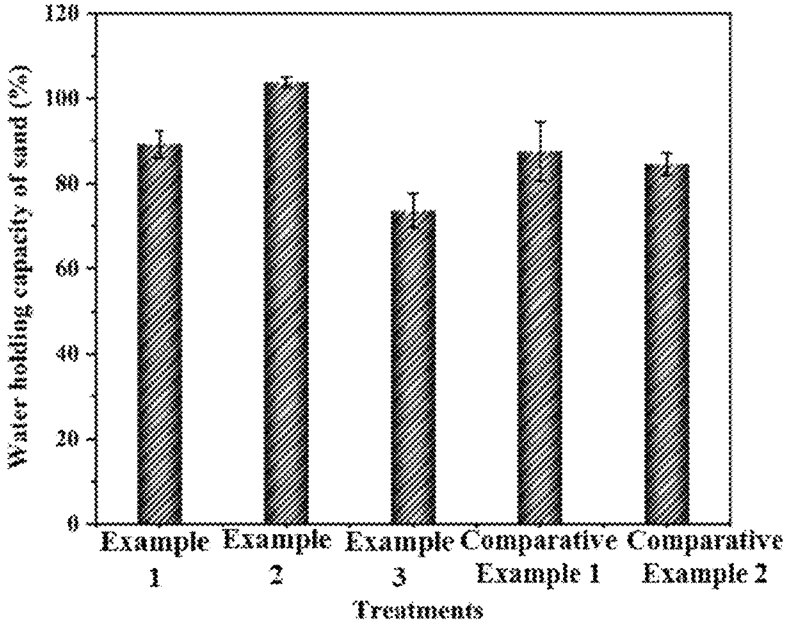
FIG. 7 shows the water-holding capacity of the sand samples added with the biodegradable urea-formaldehyde-based sand-fixing polymer materials prepared in Examples 1-3 and the composites prepared in Comparative Examples 1-2, respectively.

As shown in FIG. 7, due to the appropriate AA/MU ratio, the sand-fixing polymer material of Example 2 had the highest water-holding capacity (103.87%). Regarding the sand-fixing polymer material of Example 3, due to the lower level of the water-absorbing component AA, it had the lowest water-holding capacity (73.61%). The water-holding capacity of the composite of Comparative Example 1 was lower than that of the sand-fixing polymer material of Example 2 because the interfacial bonding strength between the $PAA_{CS}/KH_2PO_4$/UF-1 and the PLA fabric in Comparative Example 1 was weak owing to no hydrogen bond interaction between its two phases, and the polymer material was partially carried away by water. It could be concluded that the biodegradable urea-formaldehyde-based sand-fixing polymer material provided herein possessed good water-holding capacity.

Figure 8:
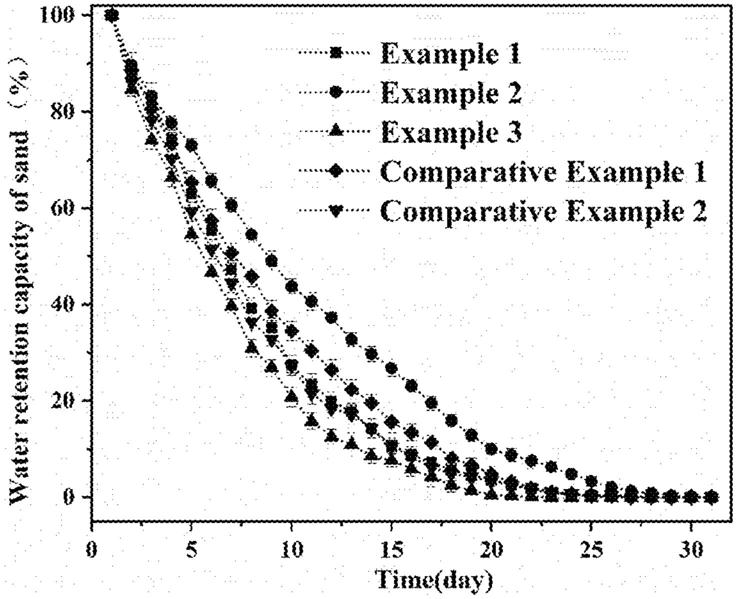
FIG. 8 shows the water retention capacity of sand samples added with the biodegradable urea-formaldehyde-based sand-fixing polymer materials prepared in Examples 1-3 and the composites prepared in Comparative Examples 1-2, respectively.

As shown in FIG. 8, the sand-fixing polymer material of Example 2 had the best water retention capacity, and there was still 0.21% (relative to the original water content) water in the corresponding sand sample after being placed at room temperature for 30 days. By comparison, there was no water left in the sand sample added with the composite of Comparative Example 1 on day 27. It can be summarized that the biodegradable urea-formaldehyde-based sand-fixing polymer material provided herein had better water-retention capacity, and can absorb and store water when raining.

Described above are only some embodiments of the present disclosure, which are not intended to limit the disclosure. It should be understood that any modifications and replacements made by those of ordinary skilled in the art without departing from the spirit of the disclosure shall fall within the scope of the disclosure defined by the appended claims.

What is claimed is:

1. A method for preparing a biodegradable urea-formaldehyde-based sand-fixing polymer material with slow nutrient release and water absorption and retention, the biodegradable urea-formaldehyde-based sand-fixing polymer material comprising:

a biodegradable urea-formaldehyde-based polymer composite with slow nutrient release and water absorption and retention; and a biodegradable polymer fabric;

the biodegradable urea-formaldehyde-based polymer composite being coated on a surface of the biodegradable polymer fabric, and being embedded in meshes of the biodegradable polymer fabric; and there being intermolecular hydrogen-bond interaction between the biodegradable urea-formaldehyde-based polymer composite and the biodegradable polymer fabric;

the method comprising:

coating the biodegradable urea-formaldehyde-based polymer composite on the surface of the biodegradable polymer fabric, followed by thermal curing of the biodegradable urea-formaldehyde-based polymer composite on the surface of the biodegradable polymer fabric, rolling at a pressure ranging from greater than 0 MPa to less than or equal to 1 MPa and a speed of 10 to 50 rpm and drying to obtain the biodegradable urea-formaldehyde-based sand-fixing polymer material.

2. The method of claim 1, wherein a coating mass of the biodegradable urea-formaldehyde-based polymer composite on the biodegradable polymer fabric is 0.1-0.5 $g/cm^2$.

3. The method of claim 1, wherein the thermal curing is performed at 45-65° C. for 0.5-4 h; and a temperature of the drying is 45-65° C.

4. The method of claim 1, wherein the biodegradable urea-formaldehyde-based polymer composite is prepared through steps of:

adding formaldehyde and urea into a reaction vessel, followed by adjustment to pH 8 and reaction at a first preset temperature for a first preset time; and adding an inorganic fertilizer containing phosphorus and potassium, and a superabsorbent polymer (SAP) or a monomer of the SAP into the reaction vessel, followed by reaction at a second preset temperature for a second preset time to obtain the biodegradable urea-formaldehyde-based polymer composite in a viscous state.

5. The method of claim 4, wherein the first preset temperature is 30-60° C.; and the first preset time is 0.5-4 h.

6. The method of claim 4, wherein the second preset temperature is 40-80° C.; and the second preset time is 0.5-4 h.

* * * * *